Patented May 11, 1937

2,080,028

UNITED STATES PATENT OFFICE 2,080,028

PROCESS FOR PRODUCING SPONGE IRON

Julian M. Avery, Greenwich, Conn., assignor, by mesne assignments, to Arthur D. Little, Incorporated, Cambridge, Mass., a corporation of Massachusetts No Drawing. Application October 4, 1934, Serial No. 746,843

6 Claims. (Cl. 75—34)

The invention relates to a process for producing sponge iron, and more especially to a process wherein lumps of iron oxide ores are reduced to metal in a shaft furnace by means of hot reducing gases in the absence of substantial proportions of solid carbon and at temperatures below the melting points of the ore and of the metallic product.

When lump iron ore is thus reduced at temperatures below its sintering or fusing point it usually forms dark-gray lumps of iron which are microscopically porous but otherwise similar in appearance and physical form to the original lumps of oxide ore. If the temperature is slightly higher than about 750° C. both the ore and the iron product of reduction are usually partly sintered to a loosely coherent body, while at temperatures above about 800° C. the iron product tends under pressure to coalesce into a pasty mass. Properly speaking, the term "sponge iron" is applied only to iron reduced from ore at temperatures below a critical temperature which is characteristic of the ore and which is usually about 1000° C., and it is so applied herein and in the appended claims.

Although many attempts have been made within the last one hundred years to develop an inexpensive, commercially successful process for producing sponge iron in large quantities, and although some of the proposed processes have appeared to offer promise of success, practical operating difficulties have intervened in each instance to prevent complete commercial success. As a result, the production of sponge iron has been limited to small operations conducted at high cost by inefficient methods.

Some of the most promising of the processes heretofore proposed comprise the reduction of lump ore by hot reducing gases in a shaft furnace. The use of lump ore offers the advantages of forming an interstitial burden of ore, and of providing lump sponge iron which is easily handled and which has such a relatively small ratio of surface to volume that reoxidation of the iron is not a serious problem. The use of hot reducing gases, such as carbon monoxide or hydrogen, or mixtures thereof, with each other or with other gases such as diluent gases, provides advantages over the use of a solid, carbonaceous reducing agent, in that the gases introduce no harmful impurities, such as carbon, sulfur, phosphorus, or silicon, into the sponge iron; in that they permit close control of temperatures within the ore bed; and in the fact that the reaction between iron oxide and carbon monoxide or hydrogen involves only a slight thermal effect, whereas the reaction between iron oxide and solid carbon is strongly endothermic. A shaft furnace is comparatively simple and inexpensive to operate, it may be constructed to have a large capacity, and it is adapted as well to continuous operation as to batch operation.

In recent years a number of leading experimenters in the field of sponge iron production have reported in detail their attempts to develop a commercially feasible method of reducing lump ore with hot reducing gases in a shaft furnace. A careful analysis of these reports shows that this method is generally recognized as the most desirable one for producing sponge iron; but that in all cases the method has been finally abandoned or greatly modified because these experimenters were unable to get the ore and sponge iron to flow freely downward through the shaft, and that the methods and equipment finally evolved as a consequence of this difficulty were not favorable to the manufacture of inexpensive, high grade sponge iron.

This paramount barrier to the successful commercial production of sponge iron arises from the fact that the reduction operation must be carried out at temperatures between about 750° C. and about 1050° C., the lower limit being determined by reaction rate of the reduction reaction and by the tendency of carbon monoxide to decompose at lower temperatures, and the upper limit being determined by the tendency of the lumps of ore and/or iron to fuse together. Many ores begin to soften and to agglomerate at temperatures as low as 750° C., and lump sponge iron under the pressure produced by a column of ore in a shaft furnace tends to agglomerate into a sticky mass at a red heat. Thus, chemical and economical considerations dictate the use of temperatures at which the ore and the sponge iron tend to agglomerate, and this effect is inimical to the success of the process.

It is an object of this invention to provide a method for ensuring the free flow of lump ore and sponge iron downwards through a shaft furnace, without introducing undesired impurities into the iron, and without interfering with the reactions or thermal conditions in the furnace.

This and other objects of the invention are successfully attained by mixing the lump iron oxide ore with approximately an equal volume of lump inert noncarbonaceous refractory material and passing this mixture in a column downward through a shaft furnace, while passing up through such column a hot reducing gas preheated to about 1000° C. Suitable refractory materials include lime, limestone, dolomite, magnesite, quartz, quartzite, granite, trap, refractory brick, refractory slag and refractory metals which are chemically inert under the conditions within the shaft. The important characteristics of the inert material are mechanical strength, a softening temperature well above 1000° C., inertness towards iron, iron ore, and hot reducing gases, and proper particle size. Low specific gravity is desirable but not essential.

A suitable size of ore is from about one quarter inch to about four inches average diameter. Although other sizes can be used, larger lumps are reduced very slowly while a large proportion of very small material greatly increases the resistance to gas flow. The refractory may if desired be used in the form of larger lumps in order to facilitate separation from the product by a simple screening operation. The refractory should form about 35% to 75%, generally about 50%, of the total volume of ore and refractory.

The inertness of the refractory is of great importance, and reactive materials, such as coke or coal, cannot successfully be substituted for inert material. The presence of carbon in the mass of ore and iron in the furnace not only tends to contaminate and to reduce the value of the sponge iron, but also chills the furnace and destroys the possibility of efficient use of the reducing gas by reason of the strongly endothermic reactions between carbon and carbon dioxide and between carbon and iron oxide, whereby heat is absorbed, the gases cooled off, and the reaction stopped, unless an excessive amount of sensible heat is introduced with the reducing gas.

I have found that it is particularly advantageous to use limestone or lime as the inert refractory material. The high heat capacity of calcined limestone tends to keep the temperature conditions stable within the lower part of the furnace, preventing rapid and wide fluctuations. Calcined limestone is relatively light in weight, and greatly reduces the apparent specific weight of the burden, thereby decreasing the tendency of the ore and sponge iron particles to crush or fuse together as they pass through the furnace. Any lime not eventually separated from the product may subsequently be useful as a fluxing constituent.

The presence of inert refractory lump material also effectively distributes the static pressure of the charge and breaks up the physical contacts of the lump ore and sponge iron in such a manner and to such an extent that free flow is obtained. The improved procedure, therefore, prevents crushing of the sponge iron by the burden of iron and ore, sintering of the lump sponge iron or iron ore into large masses or agglomerations, sticking of the sponge iron and partly reduced ore to the furnace walls, and bridging and hanging up of the charge.

By the use in combination of a properly designed furnace having an ample cross-section, of a sufficient volume of inert refractory material, and of properly sized materials, it is possible to maintain a continuous flow of solid materials downward through the shaft furnace and of gases through the mass in any desired direction without channelling. While it is preferred to use physically strong and relatively pure iron ores, weaker and less pure ores may be used.

Experiments which I have made on a semi-commercial scale demonstrate the advantages of the invention. In these experiments a shaft furnace was used, and the reducing gas was carbon monoxide preheated to about 950° C. In one test briquetted crushed magnetite, sized about ½ inch by 4 inches, was used without refractory material, the maximum temperature in the furnace being about 950° C. After a short period the furnace plugged up and it was necessary to shut down and cool the charge before it could be withdrawn. It was found that a considerable part of the ore had sintered together into a large solid lump. In a second test, lump magnetite iron ore was used without refractory, the maximum temperature being about 850° C. Again the furnace plugged up and considerable sintering and fusing of the ore and sponge iron took place. In a third test, lump magnetite ore was mixed with about an equal volume of lump limestone, the maximum temperature in the furnace being at various times from 800° C. to 950° C. The charge moved continuously and successfully through the furnace for a period of many days. In a fourth test, crushed firebrick was substituted for the limestone, with equally favorable results. Towards the end of the last-mentioned test no refractory material was added for a short period, and although the charge was for a time kept moving by poking it from the top with an iron bar, it eventually plugged up as before.

While examples have been used herein by way of illustration, the invention is not limited to or by the specific expedients mentioned, except as may be required by the state of the art.

Separation of the sponge iron, produced in these tests, from the inert material was readily accomplished by hand sorting. It is evident that mechanical methods of separation, as by screening or magnetic separation, may be used.

I claim:

1. Method of producing sponge iron which comprises mixing lump iron oxide with a substantial proportion of lump inert non-carbonaceous refractory material, and passing a hot reducing gas through the mixture.

2. Method of producing sponge iron which comprises mixing lump oxide iron ore with a substantial proportion of lump inert non-carbonaceous refractory material, the size of said lumps being approximately one-quarter inch to four inches in diameter; passing the mixture in a column down through a shaft furnace; and passing a hot reducing gas through said column.

3. Method of producing sponge iron which comprises mixing lump oxide iron ore with an approximately equal proportion of lump limestone, the size of said lumps being approximately one-quarter inch to four inches in diameter; passing the mixture in a column continuously down through a shaft furnace; and passing up through said column a hot reducing gas containing a substantial proportion of carbon monoxide; the temperature of said column being less than about 1050° C. in all parts thereof.

4. A method of preparing a lump oxide iron ore furnace charge for use in the production of sponge iron in a shaft furnace by the action of hot reducing gases on the said ore which comprises the step of mixing the said ore with a substantial proportion of lumps of an inert non-carbonaceous refractory material, whereby the said charge is rendered substantially non-agglomerating at temperatures below about 1050° C.

5. A substantially non-agglomerating furnace charge for use in the production of sponge iron, which comprises a mixture in approximately equal parts by volume of lump iron oxide and lump non-carbonaceous refractory material, the said lumps being approximately one-quarter inch to four inches in diameter.

6. A substantially non-agglomerating furnace charge for use in the production of sponge iron, which comprises a mixture in approximately equal parts by volume of lump iron oxide and lump limestone, the said lumps being approximately one-quarter inch to four inches in diameter.

JULIAN M. AVERY.